US005536441A

United States Patent [19]

Chapple et al.

[11] Patent Number: 5,536,441

[45] Date of Patent: Jul. 16, 1996

[54] BLEACH CATALYST COMPOSITION

[75] Inventors: Andrew P. Chapple, Wrexham; Jayne E. Nation, Birkenhead; William D. Emery, Wirral, all of United Kingdom; Hermien W. Plomp; Marten R. P. Van Vliet, both of Rotterdam, Netherlands; Cornelis B. Donker, Haarlem, Netherlands; Clemens O. Monir, Vlaardingen, Netherlands

[73] Assignee: Lever Brothers Company, Division of Conopco, Inc., New York, N.Y.

[21] Appl. No.: 299,768

[22] Filed: Sep. 1, 1994

[30] Foreign Application Priority Data

Sep. 3, 1993 [GB] United Kingdom .................. 9318295

[51] Int. Cl.[6] ........................... C09K 3/00; C01B 15/00; C11D 3/395

[52] U.S. Cl. ............................... 252/186.33; 252/186.38; 502/152; 502/160; 502/167; 510/310; 510/311; 510/376

[58] Field of Search ......................... 252/186.33, 186.38, 252/186.27, 95, 96, 97, 98; 502/151, 152, 160, 167, 171, 200

[56] References Cited

U.S. PATENT DOCUMENTS

| | | | |
|---|---|---|---|
| 4,626,373 | 12/1986 | Finch et al. . | |
| 4,711,748 | 12/1987 | Irwin et al. | 264/117 |
| 5,227,084 | 7/1993 | Martens et al. | 252/95 |
| 5,246,621 | 9/1993 | Favre et al. . | |
| 5,356,554 | 10/1994 | Delwel et al. | 252/94 |
| 5,409,627 | 4/1995 | Boskamp et al. | 252/102 |

FOREIGN PATENT DOCUMENTS

| | | |
|---|---|---|
| 0237111 | 9/1987 | European Pat. Off. . |
| 0443651 | 8/1991 | European Pat. Off. . |
| 0458397 | 11/1991 | European Pat. Off. . |
| 0458398 | 11/1991 | European Pat. Off. . |
| 0544440 | 6/1993 | European Pat. Off. . |
| 0549272 | 6/1993 | European Pat. Off. . |
| WO94/21777 | 9/1994 | WIPO . |

OTHER PUBLICATIONS

J. Am. Chem. Soc., 1988, 110, pp. 7398–7411.

Chem. Soc. Chem. Commun., 1988, pp. 1145–1146.

J. Chem. Soc. Chem. Comm., 1987, pp. 886–887.

Inorg. Chem. Apr. 10, 1985, vol. 24, No. 8, pp. 1230–1235.

Inorg. Chem. Aug. 1982, vol. 21, No. 8, pp. 3085–3090.

*Primary Examiner*—Gary Geist
*Assistant Examiner*—Joseph D. Anthony
*Attorney, Agent, or Firm*—Milton L. Honig

[57] ABSTRACT

A bleach catalyst composition in the form of non-friable composite granules comprising:

i) a manganese complex catalyst being one of three defined formulae herein;

ii) a water-soluble binding agent, preferably selected from soap/fatty acid mixtures, polyethylene glycols of molecular weight in the range 500 to 3000, tallow and coco ethanolamides, nonionic surfactants and mixtures thereof; and iii) an inert solid selected from zeolites, silicas, clays, alumina, titanium dioxide and mixtures thereof; and each granule having a pH within the range from 4.5 to 8.5.

The granular, manganese complex-based bleach catalyst composition may be incorporated in detergent and/or bleaching compositions, with good resulting stability and homogeneity of distribution.

6 Claims, No Drawings

BLEACH CATALYST COMPOSITION

FIELD OF THE INVENTION

This invention relates to a bleach catalyst composition. In particular, it relates to a stable bleach catalyst composition, comprising a manganese complex as the active bleach catalyst, in a form suitable for use in or in conjunction with a detergent and/or bleach composition.

BACKGROUND OF THE INVENTION AND PRIOR ART

Previously, manganese complexes have been proposed as catalysts to enhance the activity of peroxygen bleaches such as hydrogen peroxide, hydrogen peroxide liberating or generating compounds and inorganic and organic peroxyacids. Such complexes include manganese-gluconate complexes, as described in EP-A-237 111, and manganese polyol complexes, as described in EP-A-443 651.

The effective amount of such complexes required in detergent and/or bleach compositions is very small, of the order of hundredths of a percent. Problems associated with the use of such small quantities include achieving an accurate dosage and homogeneous distribution of the complex throughout the composition. Inhomogeneity in the distribution of the complex may result in an inconsistent performance of the detergent and/or bleach composition.

Good distribution of the complex in a composition may be achieved by spraying a solution thereof, onto a base detergent formulation. However, this has its disadvantages in that direct contact between the manganese complex and other components present, for example nonionic detergent active and peroxygen bleaching agent, may result in a reduction in the level of these active components as a result of adverse redox reactions.

Another option would be to mix pure crystals of the manganese complex with the base detergent and/or bleach formulation. However, this may also result in interactions between individual components with consequential losses in levels of active materials.

In particular, interaction between the manganese complex and a peroxide bleach may result in rapid decomposition of the bleach during storage.

A further problem which may arise when manganese is incorporated in a base formulation is the formation of brown inactive manganese dioxide during storage and/or upon powder dissolution.

Previously, in order to overcome such problems, it has been proposed to form heavy metal complexes into agglomerates prior to addition to a detergent base formulation. An example is U.S. Pat. No. 4,626,373 which teaches manganese complexes, comprising Mn(II) and a ligand such as ethylenediamine tetraacetic acid or diethylene triamine pentaacetic acid, may be protected by encapsulating them in a matrix of a water-soluble or water-dispersible material.

The present invention is particularly concerned with a highly reactive manganese complex catalyst, as described in EP-A-0 458 397 and EP-A-0 458 398, and derivatives thereof.

EP-A-0 544 440 is concerned with such manganese complex catalysts and suggests overcoming the aforementioned problems by forming non-friable composite granules comprising the complex, a binding agent such as a polymer, a silicate or fatty acid/soap mixture and, optionally, an inert salt such as a chloride or carbonate.

Another suggestion, taught by our copending International Patent Application PCT/EP94/00640 (corresponding to UK Patent Application 9305598.6) involves forming granules comprising the complex; a carrier material selected from zeolite, alkali metal sulphate, citric acid, succinic acid and starch; and a binding agent selected from water-soluble non-oxidisable polymers, alkalimetal silicates and saturated fatty acid soap.

SUMMARY OF THE INVENTION

We have now found granules comprising the manganese complex catalyst, a soluble binding agent and neutral inert solid overcome at least some of the disadvantages associated with known systems and show good storage stability.

Accordingly the present invention provides a bleach catalyst composition in the form of non-friable composite granules, characterised in that the granules comprise:

i) a manganese complex catalyst selected from:

(a) dinuclear manganese complexes of formula:

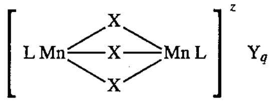

wherein each Mn is manganese which may independently be in the III or IV oxidation state;

each X independently represents a coordinating or bridging species selected from the group consisting of $H_2O$, $O_2^{2-}$, $O^{2-}$, $OH^-$, $HO_2^-$, $SH^-$, $S^{2-}$, >SO, $Cl^-$, $N^{3-}$, $SCN^-$, $NH_2^-$, NR, $R^a{}_3SO_4^-$, $R^aSO_3^-$ and $R^aCOO^-$ where $R^a$ is selected from H, alkyl, aryl, substituted alkyl and substituted aryl and $R^bCOO^-$, where $R^b$ is selected from alkyl, aryl, substituted alkyl and substituted aryl;

z denotes the charge of the complex and is an integer which can be zero, positive or negative;

Y is a monovalent or multivalent counter-ion, leading to charge neutrality, which is dependent upon the charge z of the complex;

q=z/[charge Y]; and

L is a ligand which is a macrocyclic organic compound of formula (I):

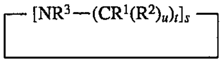 (I)

wherein t is an integer from 2 to 3; s is an integer from 3 to 4, u is 0 or 1; $R^1$, $R^2$ and $R^3$ are each independently selected from H, alkyl, aryl, substituted alkyl and substituted aryl;

(b) dinuclear manganese complexes of formula:

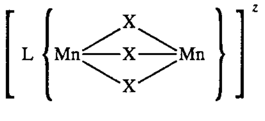

wherein each Mn is manganese which may independently be in the III or IV oxidation state;

each X independently represents a coordinating or bridging species selected from the group consisting of $H_2O$, $O_2^{2-}$, $O^{2-}$, $OH^-$, $HO_2^-$, $SH^-$, $S^{2-}$, >SO, $Cl^-$, $N^{3-}$, $SCN^-$, $NH_2^-$, NR, $R^a{}_3SO_4^-$, $R^aSO_3^-$ and $R^aCOO^-$ where $R^a$ is selected from H, alkyl, aryl, substituted alkyl and substituted aryl and $R^bCOO^-$, where $R^b$ is selected from alkyl, aryl, substituted alkyl and substituted aryl;

z denotes the charge of the complex and is an integer which can be zero, positive or negative;

Y is a monovalent or multivalent counter-ion, leading to charge neutrality, which is dependent upon the charge z of the complex;

q=z/[charge Y]; and

L is a ligand which comprises two species of formula (II):

$$[NR^4-(CR^1(R^2)_u)_t]_s \quad (II)$$

wherein t is an integer from 2 to 3; s is an integer from 3 to 4, u is 0 or 1; $R^1$, $R^2$ and $R^4$ are each independently selected from hydrogen, alkyl, aryl, substituted alkyl and substituted aryl, with the proviso that a bridging unit $R^5$ is formed by one $R^4$ unit from each ligand where $R^5$ is the group $(CR^6R^7)_n$—$(D)_p$—$(CR^6R^7)_m$ where p is 0 or 1; D is selected from a heteroatom such as oxygen and $NR^8$ or is part of an aromatic or saturated homonuclear or heteronuclear ring, n is an integer from 1 to 4;

m is an integer from 1 to 4;

with the proviso that n+m≦4;

$R^6$ and $R^7$ are each independently selected from H, $NR^9$ and $OR^{10}$, alkyl, aryl, substituted alkyl and substituted aryl; and $R^8$, $R^9$, $R^{10}$, are each independently selected from H, alkyl, aryl, substituted alkyl and substituted aryl;

(c) mononuclear manganese complexes of formula:

$$[L\ Mn\ X_p]^z Y_q$$

wherein Mn is manganese in the II, III or IV oxidation state; each X represents a coordinating species independently selected from $OR^{11}$, where $R^{11}$ is a $C_1$–$C_{20}$ radical selected from the Group consisting of alkyl, cycloalkyl, aryl, benzyl and radical combinations thereof or at least two $R^{11}$ radicals may be connected to one another so as to form a bridging unit between two oxygens that coordinate with the manganese, $Cl^-$, $Br^-$, $I^-$, $F^-$, $NCS^-$, $N_3^-$, $I_3^-$, $NH_3$, $OH^-$, $O_2^{2-}$, $HOO^-$, $H_2O$, SH, $CN^-$, $OCN^-$, $S_4^{2-}$, $R^aCOO^-$, $R^aSO_3^-$, where $R^a$ is selected from H, alkyl, aryl, substituted alkyl and substituted aryl and $R^bCOO$ where $R^b$ is selected from alkyl or aryl, substituted alkyl and substituted aryl and mixtures thereof;

p is an integer from 1 to 3;

z denotes the charge of the complex and is an integer which can be zero, positive or negative;

Y is a monovalent or multivalent counter-ion, leading to charge neutrality, which is dependent upon the charge z of the complex;

q=z/[charge Y]; and

L is a macrocyclic organic compound of formula (I) as hereinbefore defined;

ii) a soluble binding agent; and iii) an inert solid; and the granule has a pH within the range from about 4.5 to about 8.5.

DETAILED DESCRIPTION OF THE INVENTION AND PREFERRED EMBODIMENTS

Examples of preferred ligands of formula (I) include 1,4,7-triazacyclononane (TACN); 1,4,7-trimethyl-1,4,7-triazacyclononane (1,4,7- $Me_3$TACN); 2-methyl-1,4,7-triazacyclononane (2-MeTACN); 1,2,4,7-tetramethyl- 1,4,7-triazacyclononane (1,2,4,7-$Me_4$TACN); 1,2,2,4,7-pentamethyl- 1,4,7-triazacyclononane (1,2,2,4,7-$Me_5$TACN); 1,4,7-trimethyl-2-benzyl-1,4,7-triazacyclononane; and 1,4,7-trimethyl-2-decyl-1,4,7-triazacyclononane. Especially preferred is 1,4,7-trimethyl-1,4,7-triazacyclononane.

An example of a preferred ligand which comprises two species of formula $$[NR^4-(CR^1(R^2)_u)_t]_s$$

is 1,2-bis (4,7-dimethyl-1,4,7,-triaza-1-cyclononyl) ethane.

The aforementioned ligands may be synthesised by the methods described in K. Wieghardt et al., Inorganic Chemistry 1982, 21, page 3086 et seq, Inorganic Chemistry, 1985,24,page 1230 et seq, and J. Chem. Soc., Chem. Comm., 1987, page 886, incorporated herein by reference.

The type of counter-ion Y for charge neutrality is not critical to the activity of the complex and can be selected from, for example, chloride; sulphate; nitrate; methylsulphate; surfactant-anions, such as the long-chain alkylsulphates, alkylsulphonates, alkylbenzenesulphonates, tosylate; trifluormethylsulphonate; perchlorate ($ClO_4^-$), $BPh_4^-$ and $PF_6^-$; with $PF_6^-$, $SO_4^{2-}$ and $ClO_4^-$ being preferred.

When the manganese complex catalyst is a dinuclear manganese complex, preferred complexes are those in which X is either $CH_3COO^-$ or $O^{2-}$ or mixtures thereof. Most preferred are those complexes in which each X is $O^{2-}$ and manganese is in the IV oxidation state.

Dinuclear manganese complexes are further described in EP-A-458 397 and EP-A-458 398, the disclosures of both of which references are incorporated herein by reference.

Mononuclear complexes are further described in EP-A-0549272 and U.S. Pat. No. 5,194,416, the disclosures of both of which references are incorporated herein by reference.

By "soluble binding agent" is meant a binding agent which is water-soluble or ½% by weight thereof will form a dispersion in a solution of 1 g of an ethoxylated nonionic surfactant (Synperonic A7 ex ICI) in 1 liter of water.

Examples of suitable water-soluble binding agents are soap/fatty acid mixtures, polyethylene glycols of molecular weight in the range from about 500 to about 3000, tallow and coco ethanolamides, nonionic surfactants such as ethoxylated nonionic surfactants and mixtures thereof. Preferably the binding agent will be a melt binder with a melting point in the range from about 35° to about 100° C., more preferably from about 40° to about 80° C. An advantage of using a melt binding agent with a melting point above about 35° C. is that it makes processing of the granules easier.

An especially preferred binding agent consists of a mixture of $C_{12}$ and $C_{18}$ fatty acids neutralised with sodium hydroxide; and, in particular, a 70:30 mixture of $C_{12}$:$C_{18}$ fatty acids which is neutralised with sodium hydroxide in such an amount that the resultant mixture contains 30% soap.

The pH of the granule according to the invention is within the range from about pH 4.5 to about 8.5. This is the pH, measured with an electrode, of a solution of 10% by weight of the granules in water, which solution has been stirred vigorously for ten minutes.

In many cases this will be the pH of the inert solid since at least some of the preferred binding agents are insoluble in water and, therefore, will not contribute to the overall pH of the granule.

By "inert solid" is meant a solid material which is chemically inert to reaction with the other components of the granule. Preferred inert solid materials include zeolites such as zeolite A24, silicas such as Gasil, Aerosil and Sorbosil (trade marks); clays such as Kaolin; alumina; titanium dioxide; and mixtures thereof. It is also possible to use a combination of materials such as zeolite neutralised with citric acid. Preferably, the inert solid material is also insoluble in water.

Without being bound by theory, the good storage stability shown by the granules according to the invention is thought to be due to the fact that the components of the granule control the pH thereof.

The granules of the invention preferably comprises from about 0.5 to about 20%, more preferably from about 1 to about 15%, by weight of the manganese complex catalyst, from about 5 to about 90% by weight of the neutral inert solid and from about 5 to about 91% by weight of the soluble binding agent.

Preferably, the granules according to the invention will also comprise a pigment, in order to improve the colour of the resulting product, and especially to render its colour as white as possible. Titanium dioxide is a particularly preferred pigment, and may be employed at any suitable level such as to give the desired product colour, e.g. up to about 30% by weight of the granules, more preferably from about 0.5 to about 10% by weight.

In many cases, however, the whiteness of the product may be further improved by use of a second pigment, especially a blue pigment, in combination with the titanium dioxide. Examples of suitable blue pigments are widely available commercially and well known in the art, such as for example Disperse Blue 69-0007 ex BASF (a C.I. pigment Blue 15:1, containing dipropylene glycol) or Colanyl-Blue B2G 100 ex Hoechst (a C.I. pigment Blue 15:3 in an aqueous propanediol dispersion).

Preferably the manganese catalyst within the granules is of an average particle size as small as possible, preferably below about 250 μm, for proper distribution and to ensure fast delivery thereof to the wash, though particles which are too small may cause handling problems during the granulation process. A preferred and optimum manganese catalyst particle size is within a range of between about 50 and about 150 μm.

Manganese catalyst particles larger than 150 μm may give distribution problems and are more difficult to granulate, whereas particles smaller than 50 μm may cause handling problems and excessive granule colouration.

Granule growth control is generally necessary in order to ensure the composite granules are of the same approximate size and bulk density as the main detergent or cleaning powder into which they are incorporated, so as to avoid segregation by percolation or by floating.

Percolation, i.e. bringing the bleach catalyst composite granules to the bottom of a detergent powder batch, pack etc., may occur during and after mixing by vibration, handling and aeration, and will specifically happen with granules which are too small and/or have too high a density. Preferably the granules will have a particle size in the range from about 150 to about 1500 μm, most preferably from about 350 to about 1000 μm. Floating will happen specifically with granules which are too large and too light. Both phenomena should generally be avoided, because they introduce errors in amounts dosed to a washing machine.

The bulk density and size of the composite granules can be controlled via the composition, the process conditions or both, as is known in the art.

The composite granules of the invention can be prepared by any of the conventional and known granulation techniques, such as using a pan-granulator, fluidised bed, Schugi mixer, Lödige ploughshare mixer, rotating drum and other low energy mixers; by compaction, including extrusion and tabletting optionally followed by pulverising and grinding; when melt binding agents are used by prilling and pastilling using a Sandvik Roto Former; and by a high shear-energy process using a high-speed mixer/granulator equipment having both a stirring action of high energy and a cutting action. Examples of such high-speed mixer/granulator equipment are the Fukae (Trade Mark) FS-G mixer manufactured by Fukae Powtech Kogyo Co. Japan. Other mixers usable in the process of the invention include the Diosna (Trade Mark) V series ex. Dierks & Söhne, Germany; the Pharma Matrix (Trade Mark) ex T. K. Fielder Ltd England; the Fuji (Trade Mark) VG-C Series ex Fuji Sangyo Co. Japan; and the Roto (Trade Mark) ex Zanchette & Co. S.r.l. Italy. Beside batch equipment, it is also possible to use a high speed mixer/granulator such as the Lödige Recycler.

The present invention also provides a detergent composition comprising non-friable composite granules comprising a manganese complex catalyst as hereinbefore defined, a water soluble binding agent and an inert solid.

The detergent composition according to the invention may further contain ingredients commonly present in such compositions. They include surface active materials including soaps, synthetic anionic, nonionic, cationic and zwitterionic detergent surfactants and mixtures thereof, preferably present in a total amount of from 0.5 to about 50% by weight, more preferably from about 1 to about 40% by weight, most preferably from about 4 to about 25% by weight. If the composition contains both anionic and nonionic surfactant, it is preferred that the nonionic surfactant is present in excess amount. Specific examples of detergency active materials suitable for use in detergent compositions of the invention are given for example in EP-A-0458397, EP-A-0458398 and EP-A- 0549272 referred to hereinabove.

The present invention further provides a bleaching composition comprising a granular bleach catalyst composition as defined above according to the primary aspect of the invention, together with a bleaching agent. By virtue of its optionally further containing one or more detergency active materials, the bleaching compositions may also be a detergent composition as defined above.

Bleaching agents present in bleaching compositions of the invention include peroxy compound bleaches such as hydrogen peroxide, hydrogen peroxide liberating compounds, hydrogen peroxide generating systems, peroxyacids and their salts, peroxyacid bleach precursor systems and mixtures thereof. Hydrogen peroxide sources include alkali metal peroxides, organic peroxide bleaching compounds and inorganic persalt bleaching compounds such as alkali metal perborates, percarbonates, perphosphates and persulphates. Specific examples of bleaching agents suitable for use in the bleaching compositions of the invention are given for example in EP-A-0 458397, EP-A- 0 458398 and EP-A-0 549272 referred to hereinabove.

Bleach precursors are well known in the art and include N,N,N',N' tetraacetyl ethylene diamine (TAED) and quaternary ammonium substituted peroxyacid precursors. Amongst the group of suitable peroxyacids is included N,N'-phthaloylaminoperoxy caproic (PAP).

The amount of bleaching agent present in bleaching compositions of the invention may vary according to the material(s) used and the bleaching system employed, and also the level of bleaching which it is desired to effect.

Generally, however, a bleaching agent or bleaching agent system in an amount of from about 0.5 to about 50% by weight of the composition may be used, more preferably from about 1 to about 40% by weight. Specific examples of suitable amounts of various types of bleaching agent for use in bleaching compositions of the invention are given in for example EP-A-0458397, EP-A-0458398 and EP-A-0549272 referred to hereinabove.

In the above bleaching and/or detergent compositions the bleach catalyst of the invention is employed preferably in such an amount as to provide the desired level of manganese complex catalyst in the wash liquor. When the dosage of the detergent/bleach composition is relatively low, e.g. about 1 and 2 g/l as used by consumers in Japan and the USA, respectively, then the Mn content in the formulation is preferably selected to be from about 0.001 to about 1.0%, preferably from about 0,005 to about 0.50%. At higher product dosages as used for example by European consumers, the Mn content in the formulation is preferably selected to be from about 0.0005% to about 0.25%, preferably from about 0,001 to about 0.1%. Typically, the bleach catalyst composition may be present in detergent and/or bleaching compositions of the invention in an amount of from about 0.01 to about 0.5% (or more preferably to a about 0.1%) by weight, more preferably from about 0.02 to about 0.08% by weight.

Other ingredients present in detergent or detergent bleach compositions of the invention may include detergency builders such as aluminosilicates, in particular zeolites, e.g. zeolite A, B, C, X and Y types, as well as zeolite MAP as described in EP-A- 0384070; and precipitating builders such as sodium orthophosphate and sodium carbonate. Such builders are preferably present in an amount from about 5 to about 80% by weight, more preferably from about 10 to about 50% by weight. Other typical ingredients may include enzymes, fluorescent agents, multifunctional polymers, stabilising agents such as ethylene diamine tetraacetate (EDTA) and polyphosphonic acid derivatives (e.g. Dequest (trade mark)).

Bleach and detergent bleach compositions of the invention can be used to bleach stained substrates by contacting the substrate in an aqueous medium with the composition.

The invention will now be further illustrated by the following non-limiting examples.

EXAMPLES

In these examples a manganese complex of formula III was used.

Step (I) Synthesis of $[Mn_2^{III}(\mu\text{-}O)_1(\mu\text{-}OAc)_2(Me_3\text{-}TACN_2](ClO_4)_2.(H_2O)$ All solvents were degassed (first a vacuum was applied over the solvent for 5 minutes and subsequently argon gas was introduced; this procedure was repeated three times) prior to use (to exclude all oxygen, which oxidizes $Mn^{II}$ to $Mn^{IV}$ and caused the formation of $Mn^{IV}O_2$). The reaction was carried out at room temperature, under argon atmosphere, unless otherwise stated.

In a 25 ml round-bottomed flask, equipped with a magnetic stirrer, 500 mg (2.91 mmol) 1,4,7-trimethyl- 1,4,7-triazacyclononane was dissolved in 15 ml ethanol/water (85/15). This gave a clear, colourless solution (pH >11). Then 0.45 g (1.80 mmol) $Mn^{III}OAC_3$.2aq was added and a cloudy, dark brown solution obtained. After the addition of 1.00 g (7.29 mmol) NaOAc.3aq, the pH fell to 8. About 15 drops of 70% $HClO_4$ solution were added to adjust the pH of the reaction mixture to 5.0. After addition of 1.50 g (12.24 mmol) $NaClO_4$, the colour of the reaction mixture changed from brown to red within about 30 minutes. Then the reaction mixture was allowed to stand for one week at room temperature and the product precipitated in the form of red crystals. The resulting precipitate was filtered over a glass filter, washed with ethanol/water (85/15) and dried in a dessicator over KOH.

Step II: Synthesis of $[Mn_2^{IV}(\mu\text{-}O)_3(Me_3\text{-}TACN)_2](PF_6)_2H_2O$ (III)

This complex was prepared as follows.

In a 50 ml round-bottomed flask, equipped with a magnetic stirrer, 661.4 mg of the material from step (I) (0.823 mmol crystals were pulverised, giving a purple powder) was dissolved in 40 ml of an ethanol/water mixture (1/1). After a five-minute ultrasonic treatment and stirring at room temperature for 15 minutes, all powder had dissolved, giving a dark-red coloured neutral solution. 4 ml of triethylamine was added and the reaction mixture turned to dark-brown colour (pH >11). Immediately 3.55 g (21.12 mmol) of sodium hexafluorophosphate ($NaPF_6$) was added. After stirring for 15 minutes at room temperature, in the presence of air, the mixture was filtered removing some manganese dioxide, and the filtrate was allowed to stand overnight. A mixture of $MnO_2$ and red crystals was formed. The solids were collected by filtration and washed with ethanol. The red crystals (needles) were isolated by adding a few ml of acetonitrile to the filter. The crystals easily dissolved, while $MnO_2$, insoluble in acetonitrile, remained on the filter. Evaporation of the acetonitrile solution resulted in the product as red flocks.

In the examples the composition of the base detergent powder used was composition A or B below:

| A | % by weight | B | % by weight |
|---|---|---|---|
| Coco PAS* | 14.4 | $C_{12}$–$C_{14}$ PAS (Na salt) | 9.36 |
| nonionic surfactant (3 EO/7 EO 56%/44%) | 14.4 | | |
| Zeolite 4A | 30.0 | nonionic surfactant 6.5 EO | 9.36 |
| Sodium carbonate | 15.0 | nonionic surfactant 3EO | 11.87 |
| Fluorescer | 0.1 | Soap | 3.23 |
| Sodium Silicate | 10.0 | Zeolite MAP** (as anhydrous) | 54.68 |
| Minors + moisture | to 100% | Sodium Carbonate | 1.99 |
| | | Sodium carboxymethyl cellulose | 1.43 |
| | | Minors + moisture | to 100% |

*primary alcohol sulphate derived from coconut oil
**zeolite MAP prepared by a method similiar to that described in Examples 1 to 3 of EP-A-384070.

Experimental Storage Tests i) With Detergent Powder A

Storage experiments were carried out in open topped glass vessels containing 15.68 g of detergent powder A, 3.2 g of sodium perborate monohydrate (ex Degussa), Dequest 2047*** granules (ex Monsanto) and 1 g of bleach catalyst granules described in examples 1, 2 or 3. The vessels were stored at 37° C./70% RH.

***'Dequest' is a Trademark for polyphosphonates ex Monsanto.

ii) With Detergent Powder B

Storage experiments were carried out in an open topped glass vessel containing 8.55 g detergent powder B, 1.25 g sodium percarbonate (Oxyper ex Interox) and 0.2 g of bleach catalyst granules described in examples 4 or 5. The vessels were stored at 37° C./70% RH.

The storage stability of all the granules was assessed visually by estimating the percentage of the bleach catalyst granules which had discoloured (from pink to brownish/black). Granules were not considered to be storage stable, if, from a visual assessment, it appeared that more than 50% of the granules had changed colour after a storage period of 5 weeks.

The brownish/black colour is considered to be characteristic of the manganese complex catalyst in the granules which have, through redox reactions, been converted into an inactive form.

The granules described in examples 1 to 3 below were prepared by granulating together in a Fukae FS-G mixer with a temperature jacket of 50° C. the individual components. Solid and liquid components were added to the mixer of temperature of 20° C. and 60°–70° C. respectively. The resultant granules were sieved to remove the fractions which were <300 microns and >1400 microns.

| Example | Composition of granule | pH of granule | Colour |
|---|---|---|---|
| 1 (Comparative Example) | 175 g of Mn catalyst (III)<br>6.5 kg of Zeolite MAP<br>2.4 kg of $C_{12}/C_{18}$ fatty acid/soap mixture+ | 9.0 | pale pink |
| 2 | 155 g of Mn catalyst (III)<br>4.0 kg of zeolite MAP<br>2.0 kg of citric acid (average particle size 50 microns)<br>1.5 kg of $C_{12}/C_{18}$ fatty acid/soap mixture | 7.0 | pale pink |
| 3 | 190 g of Mn catalyst (III)<br>6.0 kg of Gasil 200 TP silica (ex Crosfield)<br>3.6 kg of $C_{12}/C_{18}$ fatty acid/soap mixture | 7.0 | pale pink |

*70% $C_{12}$ fatty acid/30% $C_{18}$ fatty acid which is 30% neutralised with sodium hydroxide. This is prepared by mixing the aforementioned fatty acids with the required amount of a 50% sodium hydroxide solution. The latter is added slowly and with intensive mixing. The resultant clear liquid solidifies in the range 40–80° C.

| Example | Storage Results |
|---|---|
| 1 | After 3 weeks >60% granules judged to have discoloured. |
| 2 | After 5 weeks <50% granules judged to have discoloured. |
| 3 | After 5 weeks <50% granules judged to have discoloured. |

The granules described in examples 4 and 5 below were prepared by granulating together in a kitchen food processor (Magimix 500) the individual components. The resultant material was sieved and the fraction in the range 500 to 1000 micron retained and used in the storage experiments.

| Example | Composition of granule | pH of granule | Colour |
|---|---|---|---|
| 4 Comparative example | 2.6 g of Mn Catalyst (III)<br>100 g Zeolite A (Wessalith P ex Degussa)<br>30 g ethoxylated nonionic surfactant (Synperonic A7 ex ICI) | 9.0 | pale |
| 5 | 2.6 g of Mn catalyst (III)<br>100 g silica (Gasil 200 TP ex Crosfield)<br>30 g ethoxylated nonionic surfactant (Synperonic A7 ex ICI) | 6.8–7.0 | pale pink |

| Example | Storage Results |
|---|---|
| 4 | After 2 days >60% granules judged to have discoloured. |
| 5 | After 10 days granules showed no sign of discolouration. |

We claim:

1. A bleach catalyst composition in the form of non-friable composite granules characterised in that the granules comprise:

i) a manganese complex catalyst selected from the group consisting of:

(a) dinuclear manganese complexes of formula:

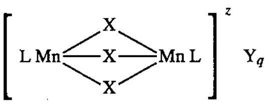

wherein each Mn is manganese which may independently be in the III or IV oxidation state;

each X independently represents a coordinating or bridging species selected from the group consisting of $H_2O$, $O_2^{2-}$, $O^{2-}$, $OH^-$, $HO_2^-$, $SH^-$, $S^{2-}$, >SO, $Cl^-$, $N^{3-}$, $SCN^-$, $NH_2^-$, NR, $R^a{}_3SO_4^-$, $R^aSO_3^-$ and $R^aCOO^-$ where $R^a$ is selected from the group consisting of H, alkyl, aryl, substituted alkyl and substituted aryl and $R^bCOO^-$, where $R^b$ is selected from the group consisting of alkyl, aryl, substituted alkyl and substituted aryl;

z denotes the charge of the complex and is an integer which can be zero, positive or negative;

Y is a monovalent or multivalent counter-ion, leading to charge neutrality, which is dependent upon the charge z of the complex;

q=z/[charge Y]; and

L is a ligand which is a macrocyclic organic compound of formula (I):

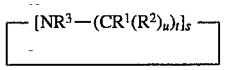 (I)

wherein t is an integer from 2 to 3; s is an integer from 3 to 4, u is 0 or 1; $R^1$, $R^2$ and $R^3$ are each independently selected from H, alkyl, aryl, substituted alkyl and substituted aryl;

(b) dinuclear manganese complexes of formula:

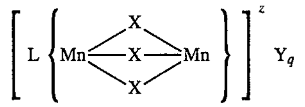

wherein each Mn is manganese which may independently be in the III or IV oxidation state;

each X independently represents a coordinating or bridging species selected from the group consisting of $H_2O$, $O_2^{2-}$, $O^{2-}$, $OH^-$, $HO_2^-$, $SH^-$, $S^{2-}$, >SO, $Cl^-$, $N^{3-}$, $SCN^-$, $NH_2^-$, NR, $R^a{}_3SO_4^-$, $R^aSO_3^-$ and $R^aCOO^-$ where $R^a$ is selected from the group consisting of H, alkyl, aryl, substituted alkyl and substituted aryl and $R^bCOO^-$, where $R^b$ is selected from the group consisting of alkyl, aryl, substituted alkyl and substituted aryl;

z denotes the charge of the complex and is an integer which can be zero, positive or negative;

Y is a monovalent or multivalent counter-ion, leading to charge neutrality, which is dependent upon the charge z of the complex;

q=z/[charge Y]; and

L is a ligand which comprises two species of formula (II):

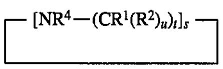

(II)

wherein t is an integer from 2 to 3; s is an integer from 3 to 4, u is 0 or 1; $R^1$, $R^2$ and $R^4$ are each independently selected from the group consisting of hydrogen, alkyl, aryl, substituted alkyl and substituted aryl, with the proviso that a bridging unit $R^5$ is formed by one $R^4$ unit from each ligand where $R^5$ is the group $(CR^6R^7)_n$—$(D)_p$—$(CR^6R^7)_m$ where p is 0 or 1; D is selected from a heteroatom such as oxygen and $NR^8$ or is part of an aromatic or saturated homonuclear or heteronuclear ring, n is an integer from 1 to 4;

m is an integer from 1 to 4;

with the proviso that $n+m \leqq 4$;

$R^6$ and $R^7$ are each independently selected from the group consisting of H, $NR^9$ and $OR^{10}$, alkyl, aryl, substituted alkyl and substituted aryl; and $R^8$, $R^9$, $R^{10}$, are each independently selected from the group consisting H, alkyl, aryl, substituted alkyl and substituted aryl;

(c) mononuclear manganese complexes of formula:

$$[L\ Mn\ X_p]^z Y_q$$

wherein Mn is manganese in the II, III or IV oxidation state; each X represents a coordinating species independently selected from the group consisting of $OR^{11}$, where $R^{11}$ is a $C_1$–$C_{20}$ radical selected from the group consisting of alkyl, cycloalkyl, aryl, benzyl and radical combinations thereof or at least two $R^{11}$ radicals may be connected to one another so as to form a bridging unit between two oxygens that coordinate with the manganese, $Cl^-$, $Br^-$, $I^-$, $F^-$, $NCS^-$, $N_3^-$, $I_3^-$, $NH_3$, $OH^-$, $O_2^{2-}$, $HOO^-$, $H_2O$, SH, $CN^-$, $OCN^-$, $S_4^{2-}$, $R^aCOO^-$, $R^aSO_3^-$, where $R^a$ is selected from the group consisting of H, alkyl, aryl, substituted alkyl and substituted aryl and $R^bCOO$ where $R^b$ is selected from the group consisting of alkyl or aryl, substituted alkyl and substituted aryl and mixtures thereof;

p is an integer from 1 to 3;

z denotes the charge of the complex and is an integer which can be zero, positive or negative;

Y is a monovalent or multivalent counter-ion, leading to charge neutrality, which is dependent upon the charge z of the complex;

q=z/[charge Y]; and

L is a macrocyclic organic compound of formula (I) as hereinbefore defined;

ii) a soluble binding agent selected from the group consisting of soap/fatty acid mixtures, polyethylene glycols of molecular weight in the range 500 to 3000, tallow and coco ethanolamides, nonionic surfactants and mixtures thereof; and iii) an inert solid selected from the group consisting of zeolites, silicas, clays, alumina, titanium dioxide and mixtures thereof; and the granule has a pH within the range from about 6.8 to 7.0.

2. A bleach catalyst composition according to claim 1, wherein the binding agent has a melting point in the range of 35° to 100° C.

3. A bleach catalyst composition according to claim 1, wherein the binding agent is a mixture of $C_{12}$ and $C_{18}$ fatty acids partially neutralised with sodium hydroxide.

4. A bleach catalyst composition according to claim 1, wherein the granules comprise from 0.5 to 20% by weight of the manganese complex catalyst, from 5 to 91% by weight of the soluble binding agent and from 5 to 90% by weight of the inert solid.

5. A bleach catalyst composition according to claim 1, wherein the granules further comprise one or more pigment materials.

6. A bleach catalyst composition according to claim 1, wherein the particle size of the manganese complex catalyst is below 250 μm.

* * * * *